United States Patent [19]

Michaels

[11] 4,359,443
[45] Nov. 16, 1982

[54] VENTING ARRANGEMENT FOR MATCHED MOLDS AND METHOD

[75] Inventor: Nathaniel E. Michaels, Sheboygan Falls, Wis.

[73] Assignee: Fiber Glass Tooling & Specialties, Sheboygan Falls, Wis.

[21] Appl. No.: 183,102

[22] Filed: Sep. 2, 1980

[51] Int. Cl.³ .................... B29C 1/00; B29F 1/00; B29G 3/00
[52] U.S. Cl. .................... 264/328.2; 264/331.11; 425/812; 425/543; 425/546; 425/595; 249/141; 249/160; 249/134
[58] Field of Search ............... 425/808, 812; 249/141; 264/101, 102, 261, 313, 331.2, 328.2

[56] References Cited

U.S. PATENT DOCUMENTS

| | | | |
|---|---|---|---|
| 2,178,774 | 11/1939 | Bogoslowsky | 425/812 |
| 2,524,737 | 10/1950 | Sawyer | 425/812 |
| 2,716,623 | 8/1955 | Tator | 425/812 |
| 2,954,586 | 10/1960 | Wacker | 425/812 X |
| 2,964,501 | 12/1960 | Sarofeen | 425/808 X |
| 3,136,000 | 6/1964 | Slyk | 249/141 |
| 3,377,662 | 4/1968 | Fukushima | 425/812 X |
| 3,799,494 | 3/1974 | McLean | 425/812 X |
| 3,822,857 | 7/1974 | Tamie | 425/812 X |
| 3,891,363 | 6/1975 | Sievers et al. | 249/141 X |

Primary Examiner—J. Howard Flint, Jr.
Attorney, Agent, or Firm—Michael, Best & Friedrich

[57] ABSTRACT

Disclosed herein is a mold assembly including first and second mold members assembled together to define a mold cavity, which first and second mold members each include a peripheral surface extending outwardly from the cavity, a gasket captured between the peripheral surfaces, and one or more tubes extending through the gasket and between the peripheral surfaces to provide communication between the cavity and the atmosphere.

9 Claims, 2 Drawing Figures

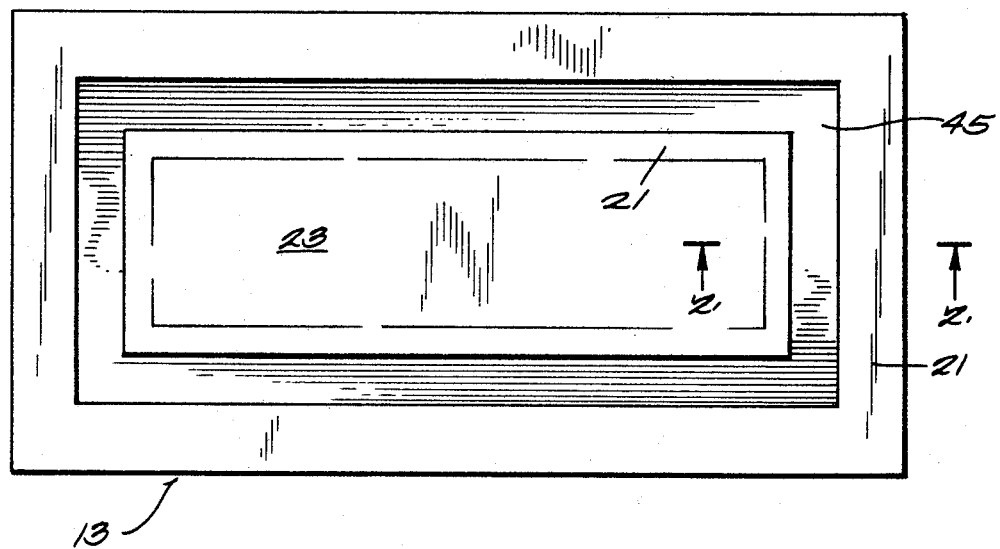
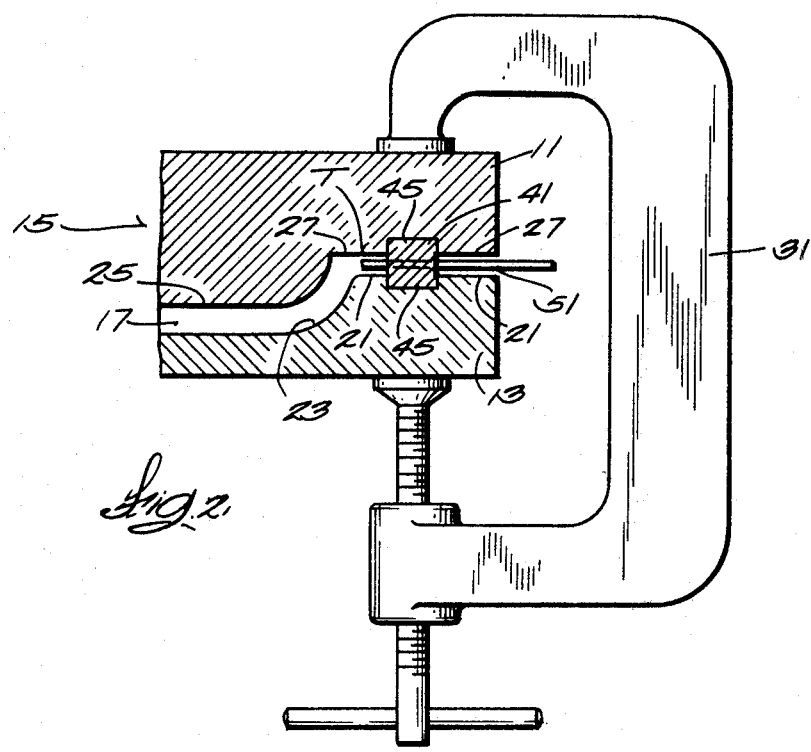

VENTING ARRANGEMENT FOR MATCHED MOLDS AND METHOD

BACKGROUND OF THE INVENTION

The invention relates generally to plastic molding processes and more particularly to resin transfer molding with wax or other release systems. The invention also relates to apparatus including a pair of matched molds into which plastic resin is inserted to fill a cavity between a pair of mold members.

Still more particularly, the invention relates to low pressure resin injection molding between a pair of matched mold members which define a cavity which is provided with fiber glass reinforcement.

Considerable difficulty has been experienced in the past in low pressure resin injection molding wherein resin under relative low pressure is injected into a cavity formed between two mold members. In particular, difficulties have been experienced in obtaining uniform density of the resin throughout the molded part. Use of the invention disclosed herein effectively reduces and/or eliminates problems associated with lack of uniformity of the density of the molded part.

SUMMARY OF THE INVENTION

The invention provides a mold assembly including first and second mold members assembled together to define a mold cavity, which first and second mold members each include a peripheral surface extending outwardly from the cavity, a gasket captured between the peripheral surfaces, and vent means extending through the gasket and between the peripheral surfaces to provide communication between the cavity and the atmosphere.

In one embodiment of the invention, the vent means comprises a tube.

In one embodiment of the invention, the tube has an internal diameter and a length which are dimensioned so as to permit air flow from the cavity, while minimizing resin flow from the cavity.

In one embodiment of the invention, a plurality of the tubes extend through the gasket.

In one embodiment of the invention, the gasket is formed of neoprene and is generally of rectangular cross section.

Other features and advantages of the embodiments of the invention will become known by reference to the following general description, claims and appended drawings.

IN THE DRAWINGS

FIG. 1 is a fragmentary plan view of one mold member of a mold assembly incorporating various of the features of the invention.

FIG. 2 is a sectional view of the mold assembly taken along line 2—2 of FIG. 1.

Before explaining one embodiment of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in the drawing are a pair of mold members 11 and 13 which are clamped together to define a mold assembly 15 and which form an interior cavity 17 into which uncured plastic resin can be injected under relatively low pressure. Any suitable form of cavity can be employed. The mold member 13 includes a planar peripheral surface 21 which is located outwardly of a female part or recess 23 and the mold member 11 includes a male part or projection 25 which extends from a planar peripheral surface 27 and which extends into the recess 23 to define the cavity 17 when the molds are assembled together. Any suitable clamping means, such as the illustrated C clamp 31, can be employed to hold together the mold members 11 and 13.

Captured between the peripheral surfaces 21 of the mold members 11 and 13 is a gasket 41 which serves to seal together the mold members 11 and 13 so as to prevent escape of injected resin from the cavity 17. In the illustrated construction, each of the peripheral surfaces 21 and 27 is provided with an endless recess or channel 45 which partially receives the gasket 41. When the mold members 11 and 13 are assembled together, the peripheral surfaces 21 and 27 are spaced apart by the gasket 41 at a distance generally equal to the thickness at the edge of the resulting molded part. The gasket 41 can be fabricated from a suitable material which is inert to thermosetting resins such as polyester and epoxy. In the disclosed construction, the gasket 41 is fabricated of neoprene and is generally about $\frac{3}{8}$ of an inch square. Any suitable rectangular or other configuration can be employed.

In order to avoid lack of uniform density within the molded part, vent means extending through the gasket 41 are provided so as to establish limited communication between the mold cavity 17 and the atmosphere. While various arrangements are possible, in the illustrated construction, such vent means comprises one or more tubes 51 which are of plastic material and which sealingly pass through suitable aperatures or openings in the gasket 41, whereby to prevent communication with the cavity 17 between the gasket 41 and the tube 51, while at the same time, provide communication through the tube 51 between the mold cavity 17 and the atmosphere. The gasket holes can be drilled or otherwise provided.

Any number of tubes 51 extending through the gasket 41 around the periphery of the cavity 17 can be employed to facilitate resin flow within the mold cavity 17 so as to attain uniform resin density in all areas of the molded part. Preferably, each tube 51 has an internal diameter and a length such that air flow from the mold cavity 17 is facilitated, while at the same time, resin flow is impeded. More particularly, because of the relative small diameter of the tube 51 as compared to the relative long length of the tube 51, resin flowing in the tube 51 tends to at least partially cure or solidify prior to reaching the tube outlet or end 53 which communicates with the atmosphere. In the event the resin does not solidify within the tube 51, the amount of resin flow through the tube or tubes 51 from the mold cavity 17 is minor because of the relatively small internal diameter of the tube 51. The tubes can be fabricated from polyethylene or polypropylene and can, for instance, have an external diameter of about $\frac{1}{8}$ of an inch, an internal diameter of about 1/16 of an inch, and a length of about 4 inches.

Alternatively, and in lieu of using the tubes 51, the gasket 41 can be provided with one or more relatively small vent holes, (not shown) which are less than 1/16 of an inch in diameter and which will permit breathing or venting through the gasket, while minimizing resin flow through the gasket.

The use of the vent holes or tubes also advantageously serves to inform the operator of the presence of resin at the periphery of the mold cavity as the resin can be visually observed through the walls of the tube or tubes 51, or at the ends of the vent holes or tubes, or through observing minor resin discharge from the vent holes or tubes.

Various of the features of the invention are set forth in the following claims:

I claim:

1. A mold assembly for molding a thermosetting resinous article, said mold including first and second mold members which are fabricated of resinous material and which are assembled together to define a mold cavity including a main portion which defines the desired article and a flange space extending from the perimeter of the main portion, said first and second mold members each including a central surface defining the cavity main portion and a peripheral surface extending outwardly from said central surface to partially define said flange space, a gasket captured between said peripheral surfaces and spaced from said central surfaces to define the periphery of said flange space, and a plurality of vent passages extending in spaced relation to each other through said gasket in spaced relation from said peripheral surfaces and around the periphery of said flange space to provide communication between said cavity and the atmosphere.

2. A mold assembly in accordance with claim 1 wherein said vent passages comprise tubes.

3. A mold assembly in accordance with claim 2 wherein said tubes are of plastic material.

4. A mold assembly for molding a thermosetting resinous article, said mold including first and second mold members which are fabricated of resinous material and which are assembled together to define a mold cavity including a main portion which defines the desired article and a flange space extending from the perimeter of the main portion, said first and second mold members each including a central surface defining the cavity main portion and a peripheral surface extending outwardly from said central surface to partially define said flange space, a gasket captured between said peripheral surfaces and spaced from said central surfaces to define the periphery of said flange space, and a plurality of vent tubes extending in spaced relation to each other through said gasket in spaced relation from said peripheral surfaces and around the periphery of said flange space to provide communication between said cavity and the atmosphere, said vent tubes each having an internal diameter and a length which are dimensioned so as to permit air flow from said cavity while minimizing resin flow from said cavity.

5. A mold assembly in accordance with claim 2 wherein each of said tubes has an internal diameter of about 1/16 of an inch and a length of about 4 inches.

6. A mold assembly in accordance with claim 1 wherein said gasket is formed of neoprene and is generally of rectangular cross section.

7. A process for making an article from a thermosetting resin, said process comprising the steps of providing a pair of opposed mold members each fabricated of resinous material and including a central surface which, when the pair of mold members are assembled in opposing relation, define a central cavity, and a peripheral flange surface which extends outwardly from the central surface, providing a gasket member, providing a plurality of vent tubes, assemblying the mold members in opposed relation and with the gasket member located between the peripheral surfaces in spaced relation from the central surfaces to provide a flange space and with the vent tubes extending in spaced relation to each other through the gasket and in spaced relation from the peripheral surfaces and around the periphery of the flange space so as to provide, when the mold members are assembled, communication between the cavity and the atmosphere, clamping together the mold members with the assembled gasket member and vent tubes to provide a mold assembly which is sealed except for communication through the vent tubes with the atmosphere, and inserting thermosetting resinous material into the cavity under relatively low pressure conditions until resinous material is present in all of the vent tubes.

8. A process for making an article from a thermosetting resin, said process comprising the steps of providing a pair of upper and lower mold members each fabricated of resinous material and including a planar flange surface and a central surface which extends inwardly from the flange surface and which, when the pair of mold members are assembled in opposing relation, define a central cavity which extends downwardly from the planar flange surfaces, providing a gasket member, providing a plurality of translucent vent tubes, assemblying the mold members in opposed relation and with the gasket member located between the flange surfaces in spaced relation from the central surfaces to provide a flange space and with the vent tubes extending in spaced relation to each other through the gasket and in spaced relation from the flange surfaces and around the periphery of the flange space so as to provide, when the mold members are assembled, communication between the cavity and the atmosphere, clamping together the mold members with the assembled gasket member and vent tubes to provide a mold assembly which is sealed except for communication through the vent tubes and the atmosphere, and inserting thermosetting resinous material into the cavity under relatively low pressure conditions until resinous material is visually present in all of the vent tubes.

9. A process for making an article from a thermosetting resin, said process comprising the steps of providing a pair of opposed mold members each fabricated of resinous material and including a central surface which, when the pair of mold members are assembled in opposing relation, define a central cavity, and a peripheral flange surface which extends outwardly from the central surface, providing a gasket member, providing a plurality of vent tubes dimensioned to permit free air flow therethrough and to restrict resin flow therethrough, assemblying the mold members in opposed relation and with the gasket member located between the peripheral surfaces in spaced relation from the central surfaces to provide a flange space and with the vent tubes extending in spaced relation to each other through the gasket and in spaced relation from the peripheral surfaces and around the periphery of the flange space so as to provide, when the mold members are assembled, communication between the cavity and the atmosphere, clamping together the mold members with the assembled gasket member and vent tubes to provide a mold assembly which is sealed except for communication through the vent tubes with the atmosphere, and inserting thermosetting resinous material into the cavity under relatively low pressure conditions until resinous material is present in all of the vent tubes.

* * * * *